(12) United States Patent
Fridley (10) Patent No.: US 7,524,179 B2
(45) Date of Patent: *Apr. 28, 2009

(54) CENTER HEATED DIE PLATE WITH TWO HEAT ZONES FOR UNDERWATER PELLETIZER

(75) Inventor: Michael A. Fridley, Eagle Rock, VA (US)

(73) Assignee: Gala Industries, Inc., Eagle Rock, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/727,406

(22) Filed: Mar. 26, 2007

(65) Prior Publication Data

US 2007/0254059 A1 Nov. 1, 2007

Related U.S. Application Data

(63) Continuation-in-part of application No. 11/041,865, filed on Jan. 25, 2005, now Pat. No. 7,402,034.

(51) Int. Cl.
*B29B 9/10* (2006.01)
(52) U.S. Cl. ............... 425/378.1; 425/67; 425/313; 425/464
(58) Field of Classification Search ............ 425/311, 425/313, 463, 464, 378.1, 67
See application file for complete search history.

(56) References Cited

U.S. PATENT DOCUMENTS

| 3,521,325 | A | 7/1970 | Shippers |
| 4,071,307 | A | 1/1978 | Porro |
| 4,123,207 | A | 10/1978 | Dudley |
| 4,621,996 | A | 11/1986 | Hundley, III |
| 4,728,276 | A | 3/1988 | Pauley et al. |
| 5,403,176 | A | 4/1995 | Bruckmann et al. |
| 5,624,688 | A | 4/1997 | Adams et al. |
| 6,409,491 | B1 * | 6/2002 | Leffew et al. ........... 425/67 |
| 6,474,969 | B1 | 11/2002 | Ready et al. |
| 6,824,371 | B2 | 11/2004 | Smit |

FOREIGN PATENT DOCUMENTS

DE 196 09 065 C1 1/1997

\* cited by examiner

*Primary Examiner*—Robert B Davis
(74) *Attorney, Agent, or Firm*—Jacobson Holman PLLC (57) ABSTRACT

A center heated die plate for an underwater pelletizer radiates heat outwardly to the extrusion orifices and die faces of the die plate thereby maintaining the die plate and extrusion orifices at an elevated temperature to obtain optimum flow of molten polymer through the extrusion orifices. In one embodiment, a cylindrical heating coil is placed in a hollow central core of the die plate and a plurality of peripheral heating elements are inserted in radial recesses distributed around an outer perimeter of the die plate to create an inner heat zone and an outer heat zone which are separately controllable.

20 Claims, 6 Drawing Sheets

CENTER HEATED DIE PLATE WITH TWO HEAT ZONES FOR UNDERWATER PELLETIZER

This is a continuation-in-part application of U.S. application Ser. No. 11/041,865 filed Jan. 25, 2005, now U.S. Pat. No. 7,402,034 issued Jul. 22, 2008.

BACKGROUND OF THE INVENTION

1. Field of the Invention

The present invention generally relates to heated die plates for underwater pelletizers and, more specifically, to center heated die plates for underwater pelletizers.

2. Description of the Related Art

Underwater pelletizers are well known and include a die plate having a plurality of extrusion orifices extending from an upstream side of the die plate to a downstream side for extruding strands of molten polymer or other extrudable materials. The extrusion orifices are arranged in one or more circular patterns concentrically of and in radially spaced relation to the center of the die plate and in spaced relation to each other. The extruded strands of polymer or other material are cut into pellets by rotating cutter blades in a water box. The blades cut the strands into pellets which have been cooled and solidified by the water in the water box. A slurry of pellets and water is discharged from the water box for subsequent removal of moisture from the exterior surface of the pellets.

It is desirable to maintain the die plate and orifices at an elevated temperature for optimum extrusion of the molten polymer through the extrusion orifices. Various efforts have been made to heat the die plate including the use of passageways in the die plate through which a heating fluid is circulated. Also, radial cavities have been formed in the periphery of die plates into which electric cartridge heaters are inserted from the external periphery of the die plate. Such known structures are typically illustrated in the following U.S. patents owned by the assignee of this application and include disclosures of heated die plates: U.S. Pat. Nos. 4,123,207; 4,621,996; 4,728,276; 5,403,176; and 5,624,688.

As illustrated in the above patents, heated die plates with concentric circular patterns of extrusion orifices are generally well known as well as passageways for heated fluid and cavities or pockets for receiving cartridge heaters. Such die plates require that portions of the die plates through which extrusion orifices would normally extend be occupied by the passageways for heating fluid or cavities for cartridge heaters. The passageways or cavities thus reduce the number of extrusion orifices that can be incorporated into the die plate since the passageways carrying the heating fluid or the cavities or pockets receiving the cartridge heaters require that the extrusion orifices be omitted from a portion of the area of the die plate. Also, the heated fluid passageways and heat cartridge cavities tend to concentrate heat radiation in areas closely adjacent to the passageways or cavities.

SUMMARY OF THE INVENTION

The center heated die plates of the present invention are installed in a conventional manner between the extruder and the water box of an underwater pelletizer. The upstream side of the die plate receives molten polymer from the extruder with the molten polymer being extruded through a plurality of orifices extending from the upstream side to the downstream side of the die plate to form extruded strands of polymer. The extruded polymer strands are cooled by water passing through the water box and are cut into pellets by rotating cutter blades associated with the downstream side of the die plate in a manner well known in the art of underwater pelletizing.

In the present invention, the circular orifice pattern of the die plate is maintained, and the central portion of the die plate is provided with a electrical resistance heating element. In one embodiment of the present invention, the center of the upstream face of the die plate, adjacent the nose cone, is removed or cut-out to provide a hollow or recessed circular central area inwardly of the nose cone. A circular heating plate is positioned in the recessed central area inwardly of the nose cone and between the nose cone and the die plate for heating the center of the die plate. The flat bottom surface of the circular heating plate is positioned flush with the bottom of the recessed central area to provide full surface contact so that heat from the heating plate flows directly to the die plate.

The die plate is retained in position in a conventional manner by fasteners that connect the extruder, die plate and water box. The nose cone is retained in position by the normally provided nose cone anchor bolt which extends through a circular opening in the center of the circular heating plate. Heater leads or heater wiring extend through a single radial hole in the die plate for attaching to a heater lead connector associated with the circular heating plate for providing power to the plate. The heater wiring can be affixed to the heater lead connector or detachable therefrom. This embodiment of the present invention can be used on one piece die plates, as well as removable center die plates.

In a second embodiment of the present invention, the entire inner diameter of the die plate is cut out to form a centrally located, cylindrical hollow area in the die plate. A cylindrically coiled electric resistance heating element is placed in the hollow inner area. The cylindrically coiled electric resistance heating element is flexible and is designed so that its outer surface is in contact with the inner surface of the die plate hollow inner area so that heat from the heating element flows directly into the die plate. The nose cone is secured by a conventional anchor bolt to close off the upstream side of the hollow inner area; and the other end is closed off by a circular insulation plug of the type disclosed in U.S. Pat. No. 6,824,371, the disclosure of which is expressly incorporated by reference as if fully set forth herein (hereinafter the "'371 patent"), or similar insulation plate, which forms a closure for the hollow downstream end of the die plate.

This second embodiment also utilizes heater leads or heater wiring which extend through a single radial hole in the die plate powering the coiled electric resistance heating element. The heater wiring is preferably formed integrally with the heating element. This embodiment of the present invention can also be used on one piece die plates, as well as removable center die plates.

Positioning the heating elements in direct contact at the center of the die plate provides more effective and more uniform radiation of heat outwardly from the center of the die plate to more effectively elevate the temperature of the die plate and extrusion orifices and more evenly heat all of the extrusion orifices which are arranged in concentric circular patterns about the center of the die plate. The present arrangement which positions the circular or cylindrical heating element in the center of the die plate also avoids elimination of extrusion orifices in certain areas of the die plate which is otherwise required when heating fluid passageways are utilized or when cavities are provided for radially extending cartridge heaters. The center heated die plate is especially beneficial when pelletizing micro pellets which utilize extrusion orifices of very small diameters in which the extruded strands and micro pellets typically have a maximum outside dimension of about 50 microns or less.

In a third embodiment of the present invention, an inner heat zone is created by a cylindrically coiled electric resistance element as in the second embodiment. However, the inner heat zone is augmented by an outer heat zone created by a plurality of rod-type heaters inserted within radial recesses formed adjacent the outer perimeter of the die plate. Each of the inner and outer heat zones is preferably controlled separately by its own thermocouple or temperature reading device, allowing the inner heating element to be run at a different temperature than the outer heaters. This embodiment of the present invention can also be used on one piece die plates, as well as removable center die plates. As illustrated herein, removable center die plates are depicted that include a die plate body and a separate tapered die plate insert of the type disclosed in U.S. Pat. No. 5,403,176, the disclosure of which is expressly incorporated herein by reference as if fully set forth (hereinafter the "'176 patent").

It is therefore an object of the present invention to provide a die plate for an underwater pelletizer having an electrical resistance heating element associated in direct heat exchange contact with a central portion of the die plate between the upstream side and the downstream side to provide heat that radiates outwardly from the center of the die plate and evenly to the extrusion orifices which are oriented in concentric circular patterns about the center of the die plate in order for the entire extrusion orifice pattern to be maintained close to an optimum temperature for extrusion of the molten polymer or other extrudate.

Another object of the present invention is to provide a center heated die plate in which the electric resistance heating element is in the form of a cylindrical coil positioned internally in a hollow die plate between the upstream and downstream sides with the hollow interior of the die plate being closed by a nose cone at the upstream side and closed by an insulation plug or plate at the downstream side with both the insulation plug and nose cone being held in position by an anchor bolt.

A further object of the present invention is to provide a center heated die plate for underwater pelletizers in which the central location of the heating element provides effective and even heating of the extrusion orifices and associated areas of the die plate to maintain all of the extrusion orifices and the molten polymer passing therethrough at a constant and even temperature to produce higher quality pellets of a more uniform size.

Still another object of the present invention is to provide a center heated die plate in which heater leads or heating wiring connected to the central heating element extend through a single radial hole in the die plate for connection to a power source outside of the die plate.

Yet a further object of the present invention is to provide a center heated die plate in accordance with the foregoing objects in which the cylindrical coil heating element forms an inner heat zone and a plurality of radially-extending, rod-type heaters are provided in the outer perimeter of the die plate to form an outer heat zone, the inner and outer heat zones being separately controllable.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Although only preferred embodiments of the invention are explained in detail, it is to be understood that the invention is not limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity. It is to be understood that each specific term includes all technical equivalents which operate in a similar manner to accomplish a similar purpose.

Figure 1:
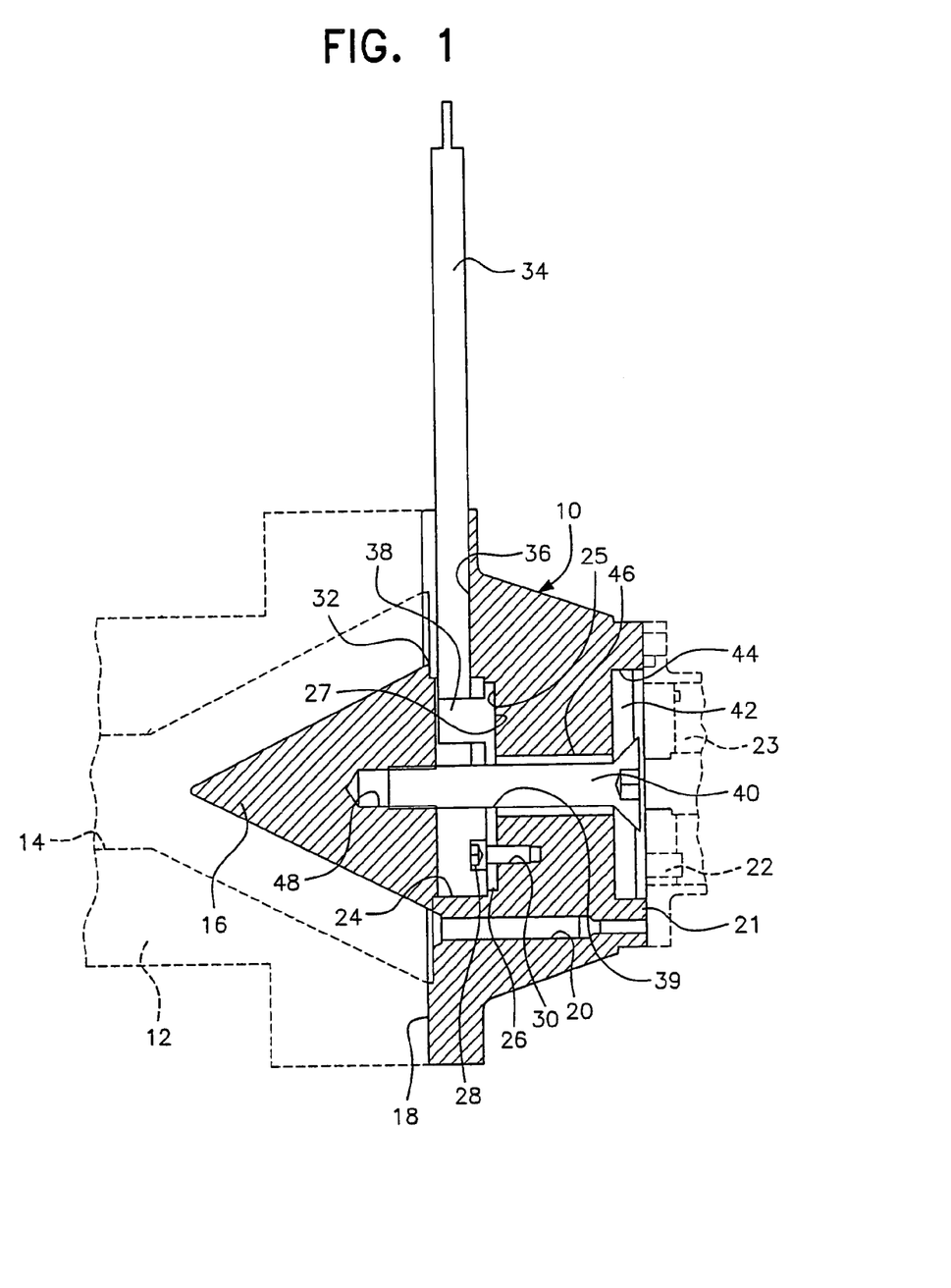
FIG. 1 is a schematic vertical sectional view of one embodiment of the center heated die plate of the present invention in which a circular heating plate is disposed in a recess in the upstream side of the die plate.
Figure 2:
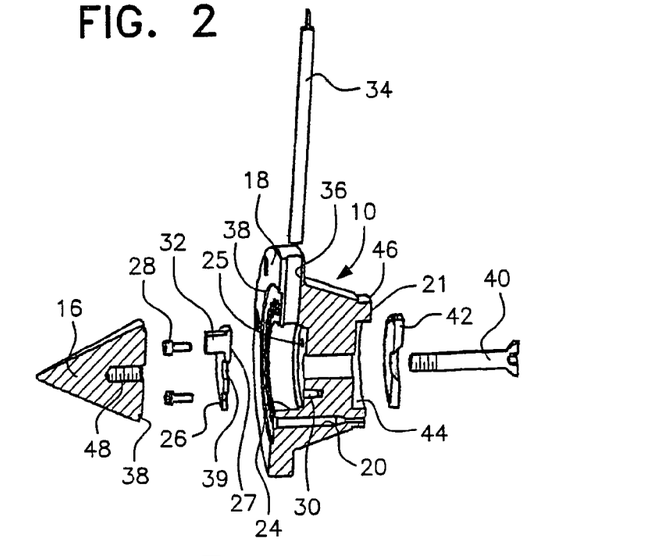
FIG. 2 is an exploded group perspective view of the structure of FIG. 1 illustrating the relationship of the circular heating plate to the die plate and pelletizer components.

Referring to the drawings, FIGS. 1 and 2 illustrate one embodiment of the center heated die plate of the present invention designated generally by reference numeral 10 associated with components of an underwater pelletizer. The underwater pelletizer includes an inlet housing 12 from a molten polymer extruder (not shown). The inlet housing 12 includes a passageway 14 for molten polymer or other extrudate (hereinafter collectively referred to as "polymer") and a nose cone 16 which directs the polymer to the upstream side 18 of the die plate 10. The die plate 10 includes one or more concentric rings of extrusion orifices 20 which extend from the upstream face 18 of the die plate 10 to the downstream face 21 of the die plate 10. A plurality of knife blade assemblies 22 mounted on a rotatably driven cutter hub 23 in a water box (not shown) of the underwater pelletizer cut the extruded cooled and solidified strands of the extruded polymer into pellets which are entrained with the cooling water passing through the water box and discharged as a water and pellet slurry with the pellets subsequently being dried by removing moisture in a dryer.

As illustrated in FIGS. 1 and 2, the upstream face or side 18 of the die plate 10 is cut out to provide an annular recess or cavity 24 inwardly of the extrusion orifices 20. The recess 24 is of circular configuration and receives a circular heating plate 26 which is secured in the bottom of the recess 24 by fasteners 28 threaded into internally threaded bores 30 to anchor the heating plate 26 in the interior of recess or cavity 24. The heating plate 26 includes a lateral connecting member 32 that connects to electrical leads 34 which extend outwardly through a radial hole or passageway 36 for connection to a source of electrical energy. The circular heating plate 26 is designed to fit neatly within recess 24 with the bottom 27 of plate 26 fitting flush against the bottom 25 of the recess 24 to provide full surface contact between surfaces 27 and 25. This full surface contact insures that heat from the circular heating plate 26 flows directly to the die plate surface 25 and thus into the die plate 10.

Once the heating plate 26 has been anchored in place and connected to the electrical leads 34, the nose cone 16 is positioned over the heating plate 26. The electrical leads 34 can be firmly attached to connector 32 or detachably connected thereto. A shallow recess 38 in the base of the nose cone 16 fits within opening 24 of the die face 18 to seal the nose cone 16 against the die face 18.

A nose cone anchor bolt 40 extends through a circular insulation plug 42, such as that disclosed in the '371 patent, that is positioned in a recess 44 on the downstream side of the die plate 10. The anchor bolt 40 extends through a central hole 46 in the die plate and a central hole 39 in the heating plate 26 and is screw threaded into a threaded bore 48 in the base of the nose cone 16. FIG. 1 illustrates the assembled condition of the components of the center heated die plate 10. The circular insulation plug 42 and anchor bolt 40 form a closure for the central bore 46. Molten polymer can then be extruded through the extrusion orifices 20 with the heat plate 26 maintaining an elevated temperature of the die plate by radiating heat outwardly from the recess or cavity 24 at points intermediate the upstream die face 18 and the downstream die face 21. The insulation plate 42 forms a closure for the downstream side of the die plate and the nose cone 16 forms a closure for the upstream side of the die plate so that the heat produced by the heat plate 26 is conducted to the die plate between the upstream and downstream faces or sides of the die plate.

The heating plate 26 of the present invention is preferably a conventional plate heater, such as commercially available from Watlow Electric Manufacturing Company, St. Louis, Mo., Model HT Foil Heater.

Figure 3:
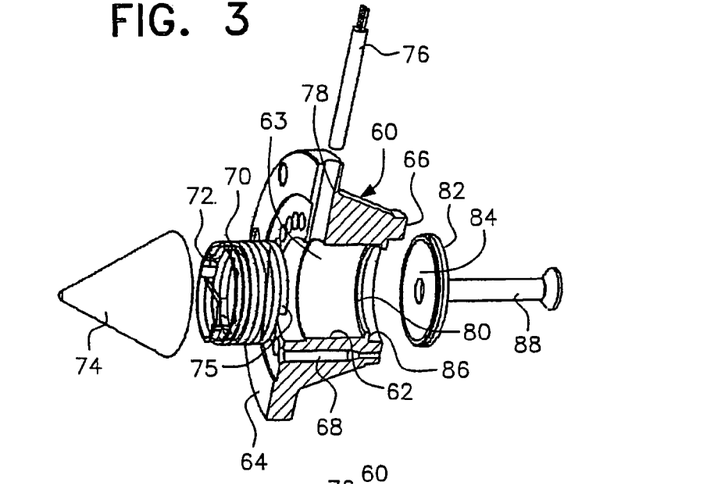
FIG. 3 is an exploded group perspective view of a second embodiment of the present invention in the form of a coil type center heated die plate and illustrating the association of the components prior to assembly.
Figure 4:
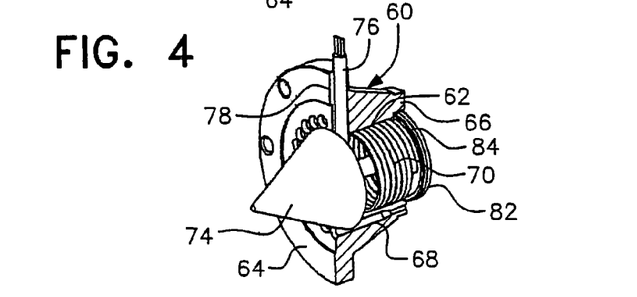
FIG. 4 is a perspective view, partially in section, illustrating the association of the components of the second embodiment of the center heated die plate of the present invention.
Figure 5:
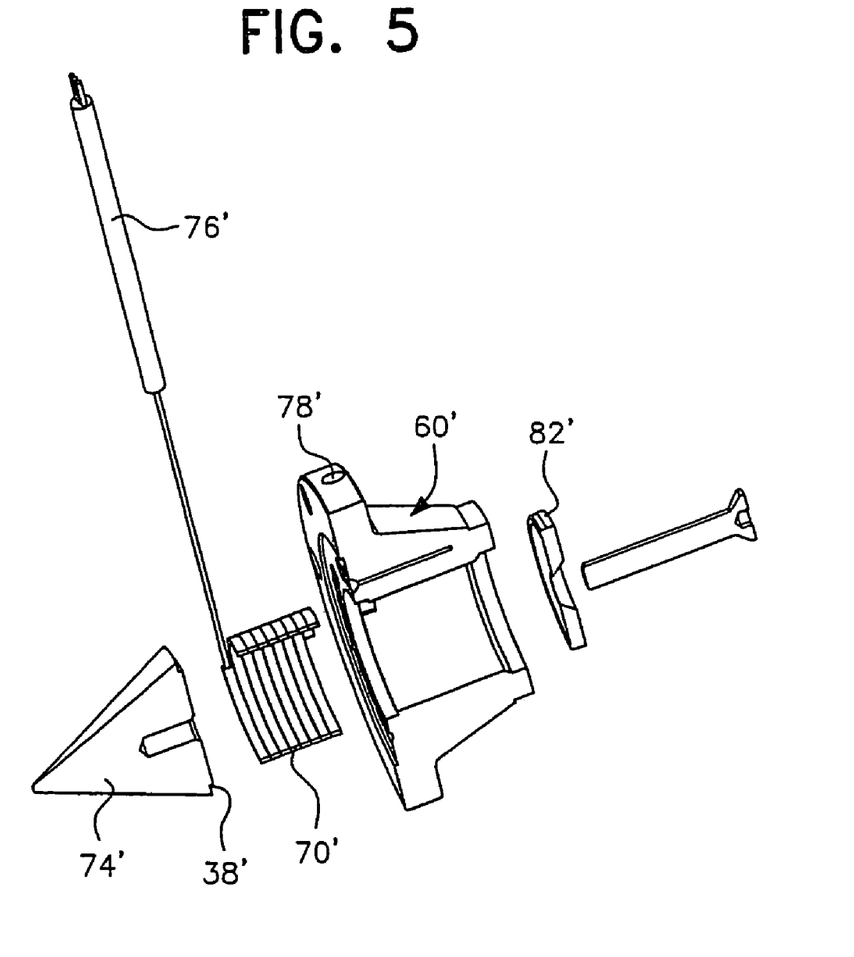
FIG. 5 is a partial exploded group perspective view of the second embodiment of the present invention, similar to FIG. 3, but showing the heater wiring formed integrally with the cylindrical coil electric resistance heating element.

FIGS. 3, 4 and 5 illustrate a second embodiment of the present invention in which the die plate, generally designated by reference numeral 60, includes a cylindrical hollow interior 62 extending from an upstream side or face 64 to a downstream side or face 66. The die plate 60 includes extrusion orifices 68 extending from the upstream side 64 to the downstream side 66 and arranged in a circular pattern of one or more circles. A heating device 70 in the form of a cylindrical coil is positioned in the cylindrical interior 62 of the die plate 60 and includes a connector 72 adjacent the nose cone 74. The nose cone 74 is secured in place with its base inwardly of the circular pattern of the extrusion orifices 68. The connector 72 is connected to electrical leads 76 which extend out through a radial hole or passageway 78 for connection to a source of electrical energy.

The heating coil 70 is disposed interiorly of the cylindrical interior 62 in direct heat exchange contact with the surface 63 of the cylindrical interior 62. The heating coil 70 is flexible so that it can be twisted with its outer diameter reduced so as to fit within the cylindrical interior 62. When released, the diameter expands so that the outer surface 71 of the coil 70 seats in direct contact with the surface 63 of the cylindrical interior 62. Thus, with the spring tension fit of the coil to the inside diameter of the interior 62, heat from the heating coil 70 passes directly into the die plate 10 through the surface 63. The downstream end 75 of the coil 70 rests against a shoulder 80 in the inner end of the cylindrical interior 62. An insulation plug or closure plate 82 is inserted into the downstream side 66 of the die plate and includes a sealing edge 84 which engages surface 86 of shoulder 80 on the die plate. A nose cone anchor bolt 88 extends through the plate 82, heating coil 70 and threads into the nose cone 74 to maintain the structure in assembled relation as illustrated in FIG. 4.

In the form of the second embodiment shown in FIG. 5, the electrical leads or heater wiring 76' which extend out through the radial hole or passageway 78' are formed integrally with the upstream end of the cylindrical coil heating device 70'. This integral structure reduces the cost and improves the quality of the cylindrical coil heater assembly.

FIGS. 6, 7, 8 and 9 illustrate a third embodiment of the present invention having multiple heating zones. Many of the components of the third embodiment are the same as or comparable to those already discussed in connection with the second embodiment. Therefore discussion of these components, which are identified by common reference numerals, will not be repeated here.

Also, while the previous embodiments of FIGS. 1-5 depicted only the die plate insert, the omission of the die plate body was only for purposes of ease in illustration. Similarly, general reference to the die plate insert as the "die plate 60" was also for ease of discussion. However, in each of the embodiments disclosed herein, the "die plate" more precisely includes a die plate insert 90 and a die plate body 92 into which the insert 90 is fitted in use.

Figure 6:
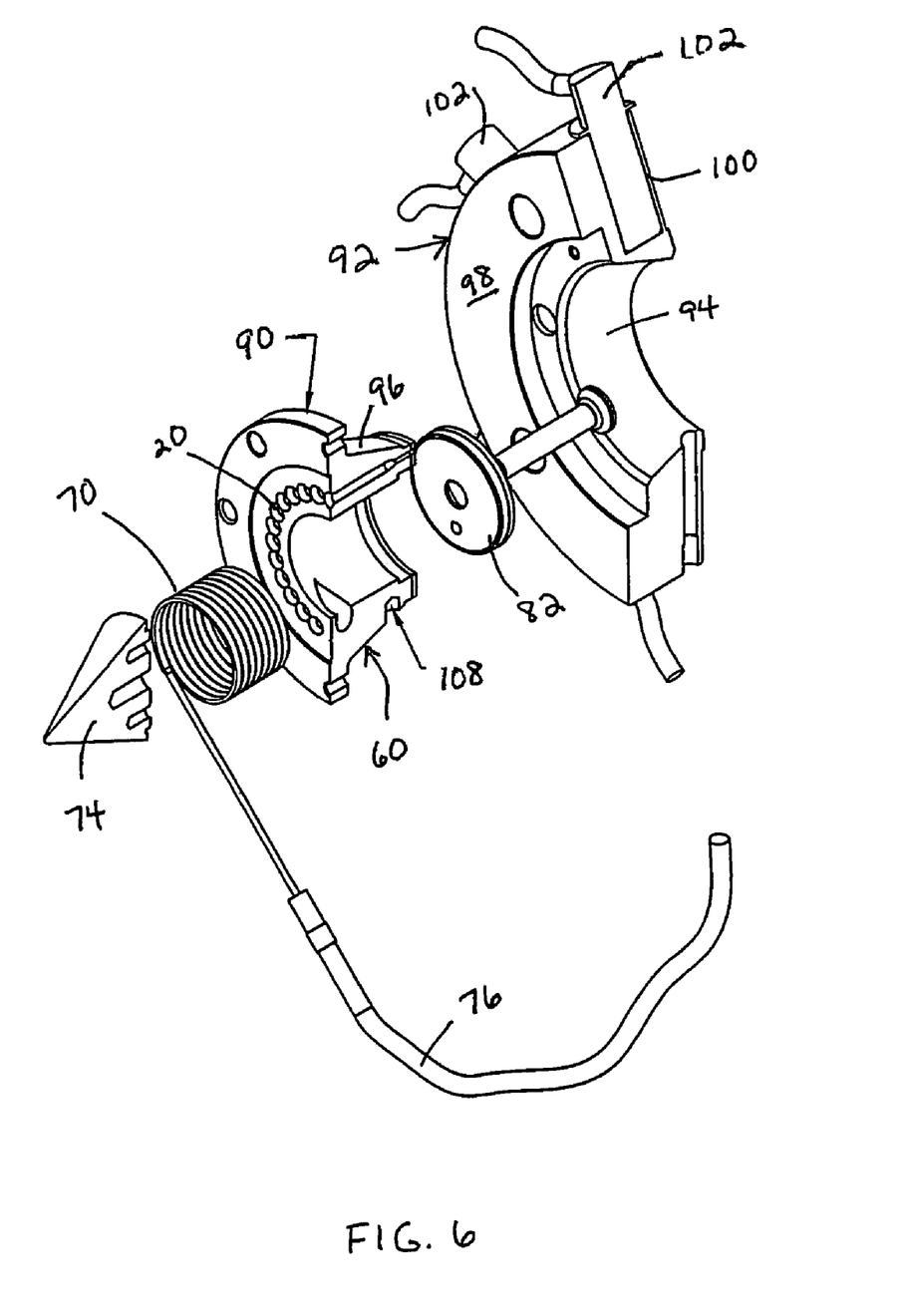
FIG. 6 is an exploded group perspective view, partially in section, of a third embodiment of the present invention having a coil type center heated die plate and a plurality of radially-extending rod-type heater elements positioned adjacent the outer periphery of the die plate.
Figure 7:
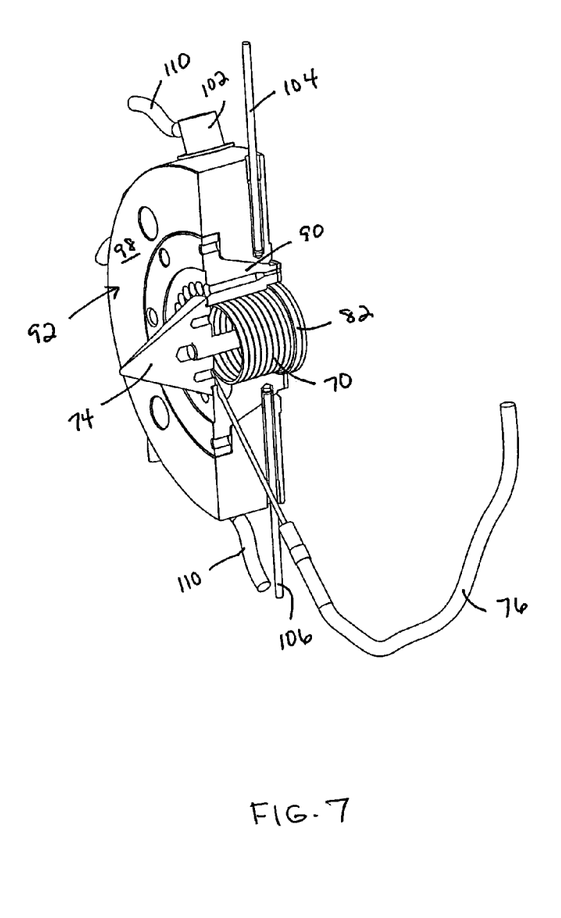
FIG. 7 is a perspective view, partially in section, illustrating the association of the components of the third embodiment of FIG. 6, as assembled.

Hence, as shown in FIGS. 6 and 7, the die plate of the third embodiment includes a die plate body 92 and a die plate insert 90 positioned in a tapered opening 94 in the die plate body 92. The insert 90 includes an outer surface 96 which has a taper corresponding to the taper of the die plate body opening 94. The enhanced heat transfer capacity obtained with these correspondingly tapered surfaces is discussed in the '176 patent previously incorporated by reference herein.

According to the third embodiment, the outer ring 98 of the die plate body 92 includes a plurality of radial recesses 100 into which are respectively fitted a plurality of peripheral heaters 102 in a manner as is known in the art. These peripheral heaters 102 create an outer heat zone and are controlled by a thermocouple 104 or other type temperature reading device positioned near the outer perimeter of the extrusion orifices 20. Heat generated by the peripheral heaters 102 in the outer heat zone is transferred inwardly to the die plate insert 90 and provides additional heating to prevent polymer freeze off in the extrusion holes 20 of the die plate insert 90. The peripheral heaters 102 may be embodied as rod or cartridge heaters as is known by persons of ordinary skill in the art.

The inner coil heater 70 according to the present invention creates an inner heat zone that is separately controllable from the outer heat zone. This separate control is provided by a second thermocouple 106 which, in the embodiment shown, is located in a recess 108 on the tapered outer surface 96 of the die plate insert 90. Having two separate thermocouples 104, 106 and two resulting heat zones is advantageous as it allows the inner heat zone to be run at a temperature higher than that of the outer heat zone to improve the running conditions of the die plate insert. However, the independent control of the two heat zones can be used to effect any relationship between the temperatures of the two zones as may be desired.

Figure 8:
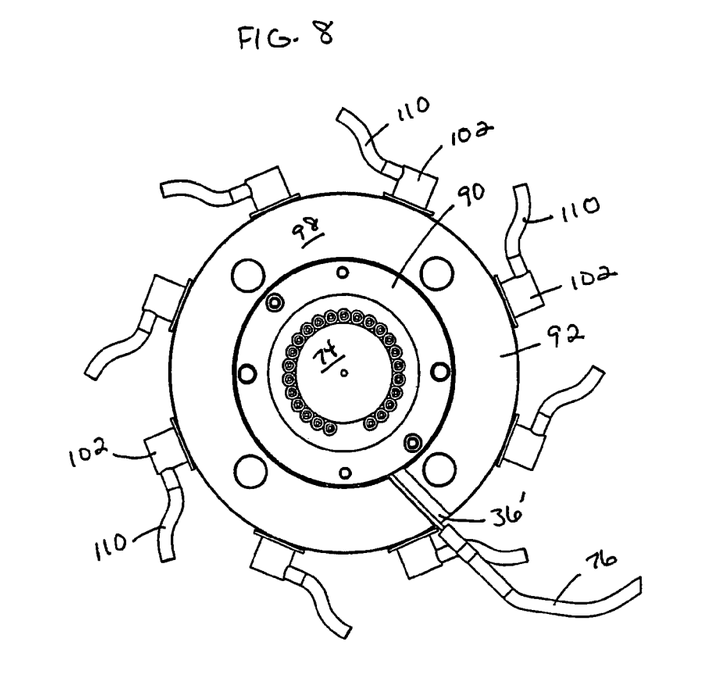
FIG. 8 is an end view of the assembled components of FIG. 7.
Figure 9:
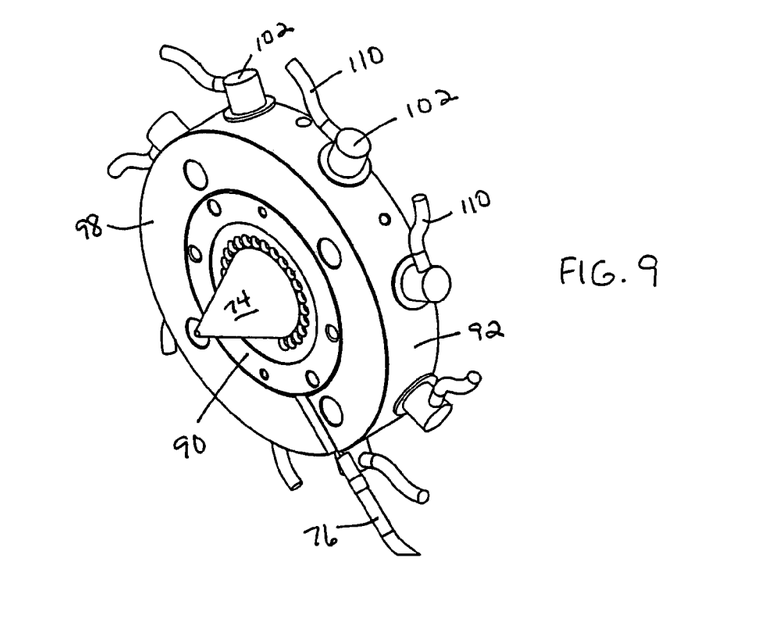
FIG. 9 is a side perspective view of the assembled components of FIG. 8.

FIGS. 8 and 9 show the assembled die plate of the third embodiment with the die plate insert 90 inserted within the die plate body 92. The electrical lead 76 from the cylindrical coil 70 passes outwardly through a radial hole or passageway 36' in the die plate body, while respective electrical leads 110 for each of the rod heaters 102 also extend outwardly from the periphery of the die plate body 92 for connection to a source of electrical energy.

The heating coil 70 and 70' of the present invention is preferably a conventional coil heater, such as that commercially available from Gebhard & Castiglia GmbH & Co., Waldbroel, Germany, Model GC Coil, which includes integral electrical leads 76'.

The foregoing should be considered as illustrative only of the principles of the invention. Since numerous modifications and changes will readily occur to those skilled in the art, it is not desired to limit the invention to the exact construction and operation shown and described. Accordingly, all suitable modifications and equivalents may be resorted to, falling within the scope of the invention.

What is claimed is:

1. A heating assembly for a pelletizer having an extrusion die plate including a plurality of orifices through which molten polymer is extruded to exit at a downstream face of said die plate as a strand cut into pellets by a moving cutting assembly, said die plate having a hollow generally cylindrical central area separate from and encircled by said orifices that extends all the way through from an upstream face of said die plate to said downstream face, said heating assembly comprising a generally cylindrical central heating element in heat exchange relation to said hollow generally cylindrical central area of said die plate to retain the central area of the die plate and said extrusion orifices adjacent and exterior thereto at an elevated temperature and maintain the polymer passing through the orifices in a molten state as the polymer passes through the orifices, and a plurality of peripheral heating elements arranged in spaced relation around said plurality of orifices.

2. The heating assembly as claimed in claim 1, wherein said central heating element and said plurality of peripheral heating elements are separately controllable to create two heat zones.

3. The heating assembly as claimed in claim 1, wherein said central heating element is a cylindrical coil heating element.

4. The heating assembly as claimed in claim 3, wherein said hollow central area of the die plate is closed at one end by a nose cone and closed at another end by an insulation plug to retain heat in the center of the die plate for radiation outwardly toward said orifices.

5. The heating assembly as claimed in claim 1, wherein said central heating element is connected to heating leads which extend through a single radial passageway in said die plate for supplying electrical power to said central heating element.

6. The heating assembly as claimed in claim 1, further comprising a first thermocouple configured to control said central heating element and a second thermocouple configured to control said plurality of peripheral heating elements independently of said first thermocouple.

7. The heating assembly as claimed in claim 1, wherein said plurality of peripheral heating elements are rod heaters inserted in radial recesses in an outer periphery of said die plate.

8. A die plate assembly for extruding polymer strands in an underwater pelletizer which comprises a plurality of extrusion orifices oriented in a circular pattern around a periphery of the die plate and extending from an upstream face of the die plate to a downstream face of the die plate, a generally cylindrical central heating element in heat exchange relation to a hollow central area of said die plate located radially inwardly of the circular pattern of said extrusion orifices to radiate heat outwardly to said extrusion orifices to maintain the polymer in a molten state during passage through said orifices, said hollow central area being separate from said extrusion orifices and also extending all the way through the die plate from the upstream face to the downstream face thereof, and a plurality of peripheral heating elements arranged in spaced relation around said plurality of orifices to radiate heat inwardly to said extrusion orifices.

9. The die plate assembly as claimed in claim 8, wherein said central heating element is a cylindrical coil and said plurality of peripheral heating elements are rod heaters inserted in radial recesses in an outer periphery of said die plate.

10. The die plate assembly as claimed in claim 8, further comprising a nose cone forming a closure for said cylindrical recess at the upstream face of the die plate and a closure plate forming a closure for said cylindrical recess at the downstream face of the die plate.

11. The die plate assembly as claimed in claim 9, wherein heating leads are formed integrally with an end of said cylindrical coil.

12. A die plate assembly for extruding polymer strands in an underwater pelletizer comprising:
   a die plate body having a tapered opening and an outer ring with a plurality of radial recesses therein;
   a die plate insert fitting within said tapered opening of said die plate body, said die plate insert including a plurality of extrusion orifices oriented in a circular pattern around a periphery thereof and extending from an upstream face of the die plate to a downstream face of the die plate;
   a central heating element positioned in a hollow generally cylindrical central area in said die plate insert that extends from said upstream face to said downstream face, said hollow central area being located radially inwardly of said extrusion orifices and being separate therefrom; and
   a plurality of peripheral heating elements received within said plurality of radial recesses in said outer ring.

13. The die plate assembly as claimed in claim 12, wherein said plurality of peripheral heating elements are rod heaters.

14. The die plate assembly as claimed in claim 12, wherein said central heating element and said plurality of peripheral heating elements are separately controllable to create two heat zones.

15. The die plate assembly as claimed in claim 12, wherein said central heating element is a cylindrical coil heater.

16. The die plate assembly as claimed in claim 15, wherein said cylindrical coil heater has a spring tension fit against an adjoining surface of said hollow central area.

17. The die plate assembly as claimed in claim 12, further comprising a first thermocouple configured to control said central heating element and a second thermocouple configured to control said plurality of peripheral heating elements independently of said first thermocouple.

18. The die plate assembly as claimed in claim 15, further comprising heating leads connected to said coil heater and extending through a single passageway in said die plate body for providing power to said coil heater.

19. The die plate assembly as claimed in claim 12, wherein a portion of said central heating element is in full surface contact with said die plate central area so that heat from said central heating element flows directly to said die plate.

20. The heating assembly as claimed in claim 3, wherein an outer surface of said cylindrical coil heating element is in spring tension contact with an inner wall of said hollow center so that heat from said coil heating element flows directly to said die plate.

* * * * *